Figure 1:
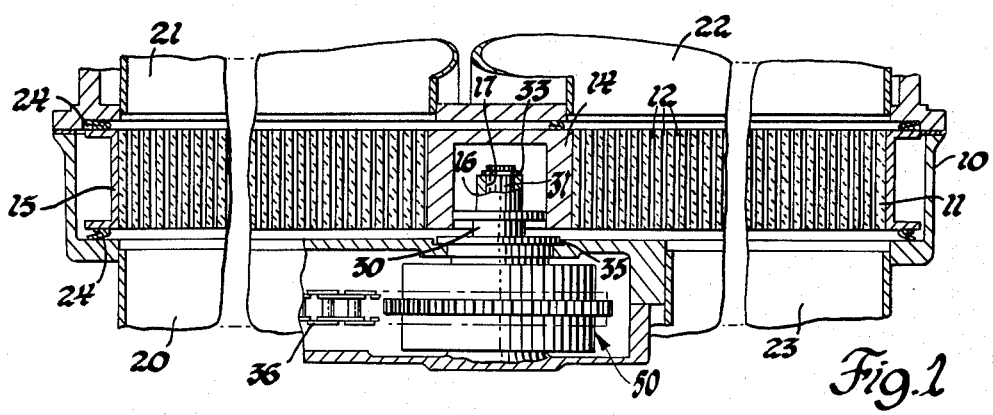

United States Patent [19]

Wagner

[11] 3,991,818

[45] Nov. 16, 1976

[54] REGENERATOR CYLINDRICAL VISCOUS DAMPER DRIVE ASSEMBLY

[75] Inventor: Douglas A. Wagner, Indianapolis, Ind.

[73] Assignee: General Motors Corporation, Detroit, Mich.

[22] Filed: June 9, 1975

[21] Appl. No.: 585,139

[52] U.S. Cl. .................... 165/8; 74/243 R; 74/243 PC; 64/27 S; 267/136; 267/137; 267/156
[51] Int. Cl.² .................. F28D 19/00; F16D 3/52
[58] Field of Search ......... 165/8; 74/243 R, 243 PC, 74/443, 440; 64/27 S; 267/136, 137, 156

[56] References Cited
UNITED STATES PATENTS

| | | | |
|---|---|---|---|
| 3,304,294 | 2/1967 | Dolza | 74/243 PC X |
| 3,462,136 | 8/1969 | Rumsey | 267/136 |
| 3,913,662 | 10/1975 | Davis | 165/8 |

FOREIGN PATENTS OR APPLICATIONS

| | | | |
|---|---|---|---|
| 515,488 | 11/1920 | France | 74/243 R |
| 1,953,196 | 4/1970 | Germany | 64/27 S |

*Primary Examiner*—Albert W. Davis, Jr.
*Attorney, Agent, or Firm*—Arthur N. Krein

[57] ABSTRACT

A cylindrical viscous damper drive assembly for driving the matrix of a rotary regenerator heat exchange apparatus, the drive assembly including an annular ring-like driven sprocket loosely encircling the annular hub at one end of a drive shaft coupled to the matrix, the sprocket being drivingly coupled to the hub by a pair of axially spaced apart split ring torsion springs, each torsion spring being pinned at one end to an end of the hub and having a radially outward extending lip at its other end that projects into a socket in the sprocket to effect the driving connection between the sprocket and hub, a pair of O-rings being positioned in axially spaced apart relation to each other to effect a sealing engagement between the outer periphery of the hub and the inner periphery of the socket whereby to define therewith a sealed annular chamber which is filled with a viscous fluid that will provide, when relative rotational movement occurs between the sprocket and hub, a dampening force to reduce torque oscillations between the hub and the sprocket and, axially spaced apart shoulder means on the sprocket extending radially inward to be in interference relation with respect to the hub and the split ring torsion springs attached thereto to limit axial movement of the sprocket relative to the hub.

6 Claims, 3 Drawing Figures

REGENERATOR CYLINDRICAL VISCOUS DAMPER DRIVE ASSEMBLY

This invention relates to a drive assembly for a rotary regenerator heat exchange apparatus or similar device and, in particular, to a cylindrical viscous damper drive assembly for the regenerator matrix of a rotary regenerator heat exchange apparatus.

Rotary regenerators, particularly those of the axial flow type, utilize a porous metal or ceramic disk matrix which is rotated so that each element thereof passes successively through two aeriform fluid flow paths, absorbing heat from a hotter fluid and releasing it to cooler fluid in these flow paths.

One application of such regenerators is in preheating the combustion air in gas turbine engines. In such an application, there is a large pressure difference between the compressed air which is heated and the turbine exhaust gases which give up heat. In order to prevent leakage of the high pressure fluid into the low pressure fluid path and, also, to prevent each fluid from bypassing the matrix, seals are provided which extend around the perimeter of one or both flow paths on each face of the regenerator, bridging the gap between the regenerator disk matrix and a face of the enclosing member or housing which is proximate to the matrix.

Because of the high temperatures at which such a regenerator must operate when employed with gas turbines, the provision of an adequate durable matrix structure and of a seal structure cooperating therewith has presented difficult problems. It has now been discovered that these problems are further aggravated by torsional oscillation or vibration of the regenerator disk.

For example, torsional vibration of the regenerator disk occurs because it is excited by the negative sloped friction characteristic of the regenerator seal material. This vibration takes place at the natural torsional frequency of the regenerator disk and its drive train. Torque oscillation in such prior art devices can be so great as to result in broken drive train parts. In such a device, the regenerator disk is the mass and the drive train is the spring of a typical spring-mass system. In the case of a chain and sprocketed drive shaft train, the springs of the system are the drive shafts and chain, the chain predominating.

It should also be realized that a typical regenerator of the type used with a gas turbine engine may have a regenerator matrix disk that is about two feet in overall diameter and about three inches thick in an axial direction.

It is therefore the primary object of this invention to provide an improved viscous damper drive assembly for a rotary regenerator heat exchange apparatus, or similar device, in which the assembly is of cylindrical configuration for purposes of simplification of design and lower costs of parts.

Another object of this invention is to provide an improved regenerator drive assembly that includes a ring-like driven sprocket encircling a matrix drive shaft and connected thereto by at least one split ring torsion spring, the sprocket and matrix drive shaft being provided with spaced apart O-rings whereby to provide an annular chamber that is filled with a viscous fluid to effect a dampening force against relative rotation between the sprocket and matrix drive shaft.

These and other objects of the invention are obtained by a cylindrical viscous damper drive assembly for a rotary regenerator heat exchange apparatus of the type including a housing, a drive shaft rotatably journalled in the housing and a matrix disk positioned in the housing and supported therein by one end of the drive shaft which is in driven engagement therewith for rotating the matrix disk within the housing, the drive shaft having at its opposite end an enlarged cylindrical hub of a predetermined axial length, a driven annular ring sprocket encircling the hub and journalled relative thereto for rotation relative to the hub, at least one split ring torsion spring being mounted within said sprocket with one end of the spring connected to one end of the hub and the opposite end of the spring being connected to the sprocket to provide a driving engagement from the sprocket to the hub, axially spaced apart seal rings being operatively associated with the exterior peripheral surface of the hub and the inner peripheral surface of the sprocket to define therewith an annular chamber filled with a viscous fluid and, axially spaced apart shoulder means associated with the sprocket to extend into interference relation with respect to the hub to retain the sprocket against axial movement relative to the hub.

Figure 2:
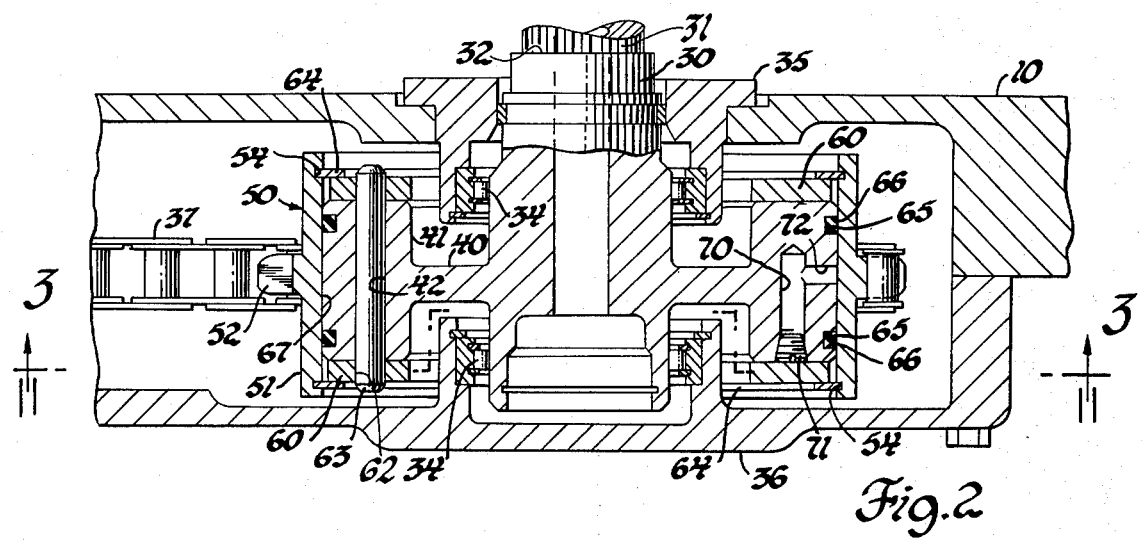
Figure 3:
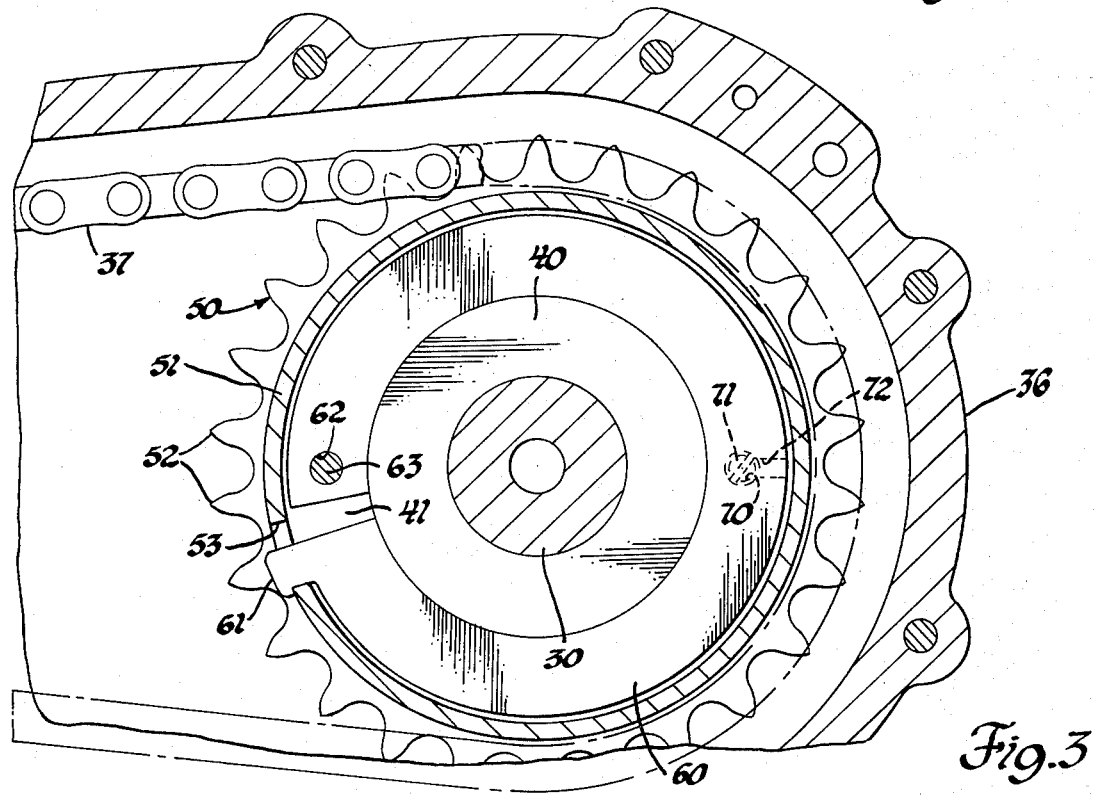

For a better understanding of the invention, as well as other objects and further features thereof, reference is had to the following detailed description of the invention to be read in connection with the accompanying drawings, wherein:

FIG. 1 is a schematic view of a rotary regenerator heat exchange apparatus taken in a plane containing the axis of rotation of the matrix disk thereof for the purpose of illustrating the general structure of such a rotary regenerator heat exchange apparatus and the drive arrangement therefor;

FIG. 2 is an enlarged sectional detailed view of the regenerator drive assembly of FIG. 1 in accordance with the invention taken in a plane containing the axis of rotation of the drive shaft of this device; and, FIG. 3 is a sectional view taken along line 3—3 of FIG. 2 illustrating the mounting arrangement of the torsion spring relative to the drive shaft and to the drive sprocket of the regenerator drive assembly of FIG. 2.

Referring first to FIG. 1, there is shown a rotary regenerator heat exchange apparatus of the type used with a gas turbine engine, the apparatus including a housing 10, generally drum-shaped, to enclose an annular, foraminous matrix disk 11 which is of such construction so as to define a multiplicity of pores or passages 12, greatly enlarged in FIG. 1, extending from face to face of the matrix, generally parallel to the axis of this matrix disk. The matrix disk 11 preferably includes an inner rim 14 and may include an outer rim 15. The matrix is rotated about an axis defined by a matrix locating and driving hub 16 coupled to the matrix, as by having the hub 16 fixed to the inner rim 14 of the matrix. Hub 16 is provided with an axial extending through bore provided with internal splines 17 along a portion thereof whereby the matrix can be located and driven through the drive assembly of the invention, to be described hereinafter.

An inlet 20 for cool high pressure air enters one face of the housing 10 and, opposite to it, an outlet 21 is provided for the discharge of compressed air which is heated after having passed through the matrix. Hot low pressure exhaust gases enter the housing through an inlet 22 and leave the regenerator through an outlet 23, the two streams of fluid thus being in a counterflow relation in the embodiments of the regenerator illustrated. As shown, the hot exhaust gas passage is of a larger area than the cool area passage because of a difference in density between these fluids. Since the exhaust gases entering through inlet 22 engage first the upper face of the matrix, with reference to FIG. 1, this is the hot side, while the lower face of the matrix is then referred to as the cold side of the regenerator.

A sealing means or sealing assembly 24 is provided between each face of the matrix 11 and the housing 10 to confine the cold and hot fluids to the desired flow paths through the matrix from inlet to outlet and minimize leakage between the paths.

Referring now to the subject matter of the invention, the drive assembly of the invention, as shown in FIG. 2, includes a drive shaft 30 provided at one end with external splines 31 on a reduced diameter portion thereof and positioned in driving engagement with the splines 17 of hub 16, the hub 16 being fixed axially with respect to the drive shaft by engagement of the hub at one end against a shoulder 32 adjacent to the splined end of the shaft and at its opposite end by a retaining ring 33 positioned in a suitable annular groove provided for this purpose in shaft 30. At its opposite end, the shaft 30 is rotatively supported by means of a pair of bearings 34, one of which is positioned in the bored boss 35 suitably fixed to housing 10 and the other is positioned in the bored boss of a chain guard and cover plate 36 suitably secured to the housing 10. The lower portion of the housing 10, with reference to FIG. 2, and the cover plate 36 are formed so as to provide an enclosed chamber for a chain 37 and a sprocket, generally designated 50, used to effect rotation of the matrix disk of the regenerator, the sprocket and its driving connection to the drive shaft 30 to be described in detail hereinafter.

As seen in FIG. 2, the bearings 34 are positioned at opposite ends of an enlarged end portion of shaft 30 which includes intermediate its ends an integral radially outward extending web 40 which terminates in an axially extending hub 41 of a predetermined outside diameter.

The sprocket 50, which is a driven sprocket driven by the chain 37 from a suitably powered drive sprocket, not shown, includes an annular ring-like rim 51 having on the outer periphery thereof an annular row of radially extending, uniformly spaced apart, sprocket teeth 52 engaged by the chain 37. The rim 51 has an inner peripheral surface of a suitable diameter whereby this rim 51 of the sprocket 50 loosely encircles the hub 41 of shaft 30 with a predetermined clearance therebetween for a purpose to be described and to permit relative rotation between these elements. The axial length of the rim 51 is substantially greater than the axial length of the hub 41 for a purpose which will become apparent.

In the embodiment shown, the sprocket 50 is in driving engagement with the hub 41 of shaft 30 by means of a pair of torsion springs 60, one at each end of the hub. As best seen in FIG. 3, each torsion spring 60 is in the form of a split ring of approximately nine-tenths of a turn and of a nominal outside diameter substantially less than the inside diameter of the rim 51 of sprocket 50 and of a nominal inside diameter corresponding to the inside diameter of the hub 41. Each torsion spring 60 is provided at one end thereof with a radially outward extending lock tang 61 received in a radial socket or notch 53 provided for this purpose in the sprocket rim 51 at each end thereof, whereby the end of the torsion spring is fixed to the sprocket 50 for rotation therewith. The opposite end of each torsion spring is provided with an aperture 62 to receive a pin 63 that is positioned in press fit in an axial extending aperture 42 in the hub 41, the pin 63 extending outward from opposite ends of the hub to engage the torsion springs 60. With this arrangement, one end of each torsion spring 60 is fixed for rotation with sprocket 50 and the opposite end of each torsion spring is fixed for rotation with shaft 30, each of these springs providing a flexible connection between the opposite ends of the spring.

Again with reference to FIG. 3, the assembly orientation of the torsion springs 60 to the shaft 30 and the sprocket 50 is a left-hand orientation, as shown, whereby to effect driving of the shaft 30 in a clockwise direction when viewed from the hub end of this shaft, as seen in this figure. A reverse or right-hand orientation of the torsion springs 60 would be required for driving the shaft 30 in a counterclockwise direction. This orientation of the torsion springs is required so that as the sprocket 50 is rotated, it will tend to spirally wind the spring to effect a drive coupling between the sprocket and the shaft in a manner whereby torsional oscillation between the sprocket and the shaft can be damped by a damper arrangement to be described. The purpose of the torsion spring 60 connection between the sprocket and the shaft is to permit differential motion between these elements on which the damper arrangement can operate.

Axial retention of the sprocket 50 on the hub 41 of the drive shaft is effected, in the embodiment illustrated, by means of a pair of split ring retainers 64 positioned in suitable annular grooves 54 provided for this purpose on the inner periphery of the rim 51 of the sprocket adjacent to the opposite ends of this rim whereby the retainers 64 can project radially inward from the rim to, in effect, provide annular shoulders outboard of the free face side of the torsion springs 60 forming an abutment against which these springs would abut to thereby limit axial movement of the sprocket relative to the shaft hub in opposite directions.

To provide dampening, a pair of ring seals, such as O-ring seals 65, are positioned in suitable axial spaced apart annular grooves 66 provided, for example, in the outer periphery of the hub 41 to be in sealing engagement with both the hub 41 and the inner peripheral surface of rim 51 of the sprocket whereby these elements define an enclosed annular chamber or cavity 67 that is filled with a suitable damper fluid, such as silicone oil, of the desired viscosity. The damper fluid is introduced into this annular cavity 67 as, for example, by means of a threaded fill port 70 in the hub 41 that extends axially from one end thereof and is closed by a threaded screw plug 71, the fill port 70 being in communication with a radial passage 72 that intersects the fill port 70 and extends radially outward to open into the annular cavity 67 at the exterior of the hub intermediate the annular grooves 66 containing the seals 65.

With this arrangement, the fill port 70 and passage 72 can also serve as a damper fluid reservoir for supplying the annular cavity 67 with damper fluid during operation. If desired, a bleed port, not shown, can be provided in communication in a suitable manner with the annular cavity whereby the cavity can be filled with damper fluid and air can be bled from the annular cavity and reservoir during the damper fluid filling operation, which of course would be performed, in the embodiment disclosed, before the lower torsion spring 60 is installed.

Thus, with a predetermined clearance between the outer periphery of the hub 41 and the inner periphery of the rim 51 of the sprocket and with a suitable viscous damper fluid in the clearance space between these elements, there will be sufficient viscous drag or friction between these elements, during operation of the regenerator, that is operative to damp out differential motion between the sprocket 50 and the hub 41 of the shaft, as allowed by the torsion springs 60. The seal rings 65 that are in sealing engagement between the hub 41 and the sprocket 50 should supply very limited drive torque between these elements and, preferably no drive torque. With this arrangement, any differential motion existing between the matrix and the drive arrangement therefor is damped by the viscous fluid in the clearance space between the hub 41 and the rim 51 of the sprocket 50.

The clearance between the hub 41 and the sprocket 50 is selected so that as the sprocket is driven to drive the hub through the torsion spring 60 connections therebetween, there will be viscous shearing of the thin film of oil in the annular cavity defined by the space between the hub and sprocket enclosed by the seals 65 to provide sufficient viscous drag between the hub and sprocket so that this viscous drag will damp out or limit torsional oscillation between the sprocket 50 and the shaft hub 41.

As previously described, relative to conventional regenerators, the regenerator disk in such a device is the mass and the conventional sprocket and drive shaft of the drive train thereof is the spring of a typical spring-mass system. Now in accordance with the cylindrical viscous damper drive assembly of the invention, as just described, there is inserted in such a rotary unit another spring in series with the others in the drive train thereof, but this spring has a lower spring rate. With reference to the embodiment shown, this additional spring, the springs 60, takes the drive torque between the sprocket 50 and the shaft 30 and the springs 60 are also flexed by any friction induced vibration. As described, the viscous damper arrangement is tied across the springs 60 and is operable only when oscillatory conditions arise between the hub 41 and the sprocket 50.

As previously described, the springs 60 join the sprocket 50 to the hub 41 of the shaft 30 and differential motion does take place between these parts when torsional vibration occurs. With this arrangement, any differential rotational motion between the sprocket 50 and the hub 41 of the shaft will effect shearing of the viscous fluid between the sprocket and hub to provide a positive damping torque. It will thus be seen that the damper arrangement of the subject drive assembly is operative in parallel with the springs 60 to effect a connection from the sprocket 50 to the shaft 30.

With the space limitations for the damper drive assembly shown in FIG. 2, a fluid with relatively high viscosity should be used in this assembly. However, it should be realized that if more space is available, this damper assembly could be made considerbly larger in diameter or of a longer axial extent to achieve adequate damping with the use of a less viscous fluid.

Although the subject drive arrangement is disclosed as being used with a rotary regenerator, it should be realized that it could be utilized in any torsional drive train where torsional vibrations are either friction induced, as in the matrix-seal friction, or result from a forcing function. Other examples of friction induced vibrations would be those resulting from tool chatter, brake squeal or clutch chatter.

What is claimed is:

1. A rotary regenerator including a housing, a drive shaft rotatably journalled in said housing, a matrix disk supported at one end on said drive shaft in driven engagement therewith for rotation within said housing, said drive shaft having at its opposite end an enlarged cylindrical hub portion of a predetermined axial length, a driven annular sprocket encircling said hub and journalled for rotation thereon relative to said hub, at least one split-ring, torsion spring mounted within said sprocket with one end of said spring connected to said hub and its other end connected to said sprocket to provide for driven engagement between said sprocket and said hub, axially spaced apart seal ring means operatively associated with the exterior peripheral surface of said hub and the inner peripheral surface of said sprocket to define therewith an annular cavity, a viscous fluid in said annular cavity in fluid engagement with the exterior peripheral surface of said hub and the inner annular surface of said sprocket and, axially spaced apart shoulder means associated with said sprocket in interference relation with respect to said hub to retain said sprocket against axial movement relative to said hub.

2. A rotary engine according to claim 1 wherein said hub further includes passage means within said hub in fluid communication with said annular cavity, said passage means being filled with additional viscous fluid to provide a reservoir of viscous fluid for said annular cavity.

3. A rotary regenerator including a housing, a drive shaft rotatably journalled in said housing, a matrix disk supported at one end on said drive shaft in driven engagement therewith for rotation within said housing, said drive shaft having adjacent its opposite end an enlarged cylindrical hub of a predetermined outside diameter and of a predetermined axial length, a driven annular sprocket encircling said hub, said sprocket having an inner peripheral surface of a diameter to provide a predetermined clearance between said inner peripheral surface of said sprocket and the outer peripheral surface of said hub, the inner peripheral surface of said sprocket having an axial length greater than said axial length of said hub and having radially outward extending notches at opposite ends thereof, a pair of split-ring, torsion springs, one of said torsion springs being connected to one axial end of said hub within said sprocket with its opposite end having a radial extending tang received within one of said notches in said sprocket, the other of said torsion springs being fixed at one end to the opposite axial end of said hub and having at its opposite end a radial extending tang engaged in the other of said notches in said sprocket, axially spaced apart seal ring means operatively associated with the exterior peripheral surface of said hub and the inner peripheral surface of said sprocket axially inboard of said torsion springs to define with said sprocket and said hub an annular cavity, a viscous fluid in said annular cavity in fluid engagement with the exterior peripheral surface of said hub and the inner peripheral surface of said sprocket and, axially spaced apart shoulder means associated with said sprocket outboard of said torsion springs which project radially inward to be in interference relation with respect to said torsion springs and said hub to axially retain said sprocket relative to said hub and to said torsion springs.

4. A rotary engine according to claim 3 wherein said hub further includes passage means within said hub in fluid communication with said annular cavity, said passage means being filled with additional viscous fluid to provide a reservoir of viscous fluid for said annular cavity.

5. A rotary mechanism including a housing, a drive shaft rotatably journalled in said housing, a driven means supported at one end on said drive shaft in driven engagement therewith for rotation within said housing, said drive shaft having at its opposite end an enlarged cylindrical hub portion of a predetermined axial length and outside diameter, a driven annular sprocket having an inner peripheral surface of a predetermined diameter greater than the outside diameter of said hub, said annular sprocket encircling said hub for rotation relative to said hub, at least one split-ring, torsion spring mounted within said annular sprocket with one end of said torsion spring connected to said hub and its other end connected to said annular sprocket to provide for driven engagement between said annular sprocket and said hub, axially spaced apart seal ring means operatively associated with the exterior peripheral surface of said hub and the inner peripheral surface of said annular sprocket to define therewith an annular cavity, a viscous fluid in said annular cavity in fluid engagement with the exterior peripheral surface of said hub and the inner peripheral surface of said annular sprocket and, axially spaced apart shoulder means associated with said annular sprocket in interference relation with respect to said hub to retain said sprocket against axial movement relative to said hub.

6. A rotary mechanism including a housing, a drive shaft rotatably journalled in said housing, a driven means supported at one end on said drive shaft in driven engagement therewith for rotation within said housing, said drive shaft having adjacent its opposite end an enlarged cylindrical hub of a predetermined outside diameter and of a predetermined axial length, a driven, annular sprocket encircling said hub, said sprocket having an inner peripheral surface of a diameter to provide a predetermined clearance between said inner peripheral surface of said sprocket and the outer peripheral surface of said hub, the inner peripheral surface of said sprocket having an axial length greater than said axial length of said hub and having radially outward extending notches at opposite ends thereof, a pair of split-ring, torsion springs, one of said torsion springs being connected to one axial end of said hub within said sprocket with its opposite end having a radial extending tang received within one of said notches in said sprocket, the other of said torsion springs being fixed at one end to the opposite axial end of said hub and having at its opposite end a radial extending tang engaged in the other of said notches in said sprocket, axially spaced apart seal ring means operatively associated with the exterior peripheral surface of said hub and the inner peripheral surface of said sprocket axially inboard of said torsion springs to define with said sprocket and said hub an annular cavity, a viscous fluid in said annular cavity in fluid engagement with the exterior peripheral surface of said hub and the inner peripheral surface of said sprocket and, axially spaced apart shoulder means associated with said sprocket outboard of said torsion springs which project radially inward to be in interference relation with respect to said torsion springs and said hub to axially retain said sprocket relative to said hub.

* * * * *